US012794996B2

(12) United States Patent
Balmakhtar et al.

(10) Patent No.: US 12,794,996 B2
(45) Date of Patent: Nov. 10, 2026

(54) PREDICTIVE AND DYNAMIC USER CONTEXT TRANSFERENCE

(71) Applicant: T-MOBILE INNOVATIONS LLC, Overland Park, KS (US)

(72) Inventors: Marouane Balmakhtar, Fairfax, VA (US); Serge Mukerji Manning, Plano, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 349 days.

(21) Appl. No.: 18/535,862

(22) Filed: Dec. 11, 2023

(65) Prior Publication Data

US 2025/0193293 A1 Jun. 12, 2025

(51) Int. Cl.

*H04L 67/61* (2022.01)
*H04L 67/568* (2022.01)
*H04W 64/00* (2009.01)

(52) U.S. Cl.

CPC ............ *H04L 67/61* (2022.05); *H04L 67/568* (2022.05); *H04W 64/00* (2013.01)

(58) Field of Classification Search

None

See application file for complete search history.

(56) References Cited

U.S. PATENT DOCUMENTS

2020/0401399 A1* 12/2020 Matsuo ..................... G06F 8/71
2022/0046075 A1* 2/2022 Li ....................... H04L 65/4038

* cited by examiner

*Primary Examiner* — Frantz Bataille
(74) *Attorney, Agent, or Firm* — SHOOK, HARDY & BACON L.L.P.

(57) ABSTRACT

Embodiments of the present disclosure are directed to systems and methods for dynamically mobilizing context from a first edge server to a second edge server to reduce latency for a user equipment (UE) utilizing edge services. The systems and methods use historical location and duration data of the UE to predict which of a plurality of adjacent edge servers to a first edge server the UE will travel to next. The systems and methods may also gather additional information such as the topography and transportation infrastructure to refine the priority list. The systems and methods may also determine the type of the UE to interpret the additional information and further refine the priority list.

20 Claims, 12 Drawing Sheets

PREDICTIVE AND DYNAMIC USER CONTEXT TRANSFERENCE

SUMMARY

The present disclosure is directed to pre-caching context data on at least one adjacent edge server to be used by a user equipment (UE) based on methods and systems of predicting and prioritizing, substantially as shown and/or described in connection with at least one of the Figures, and as set forth more completely in the claims.

According to various aspects of the technology, a user equipment (UE) initializes an edge instance to utilize edge computing services on an edge server via a radio access network (RAN) within a geographic edge area. As the UE enters a peripheral area of the geographic edge area, a set of data used by the edge server for edge computing services, context, is dynamically mobilized to edge servers in adjacent geographic edge areas which the UE may enter. To predict which geographic edge area the UE will enter next, the historical location and duration data of the UE from previous edge instance is analyzed and a priority list of adjacent edge servers is developed. In some aspects of the present disclosure additional information may be used to further enhance this prediction, such as geographic feature data, transportation infrastructure data, the type of equipment of the UE, and situational data.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
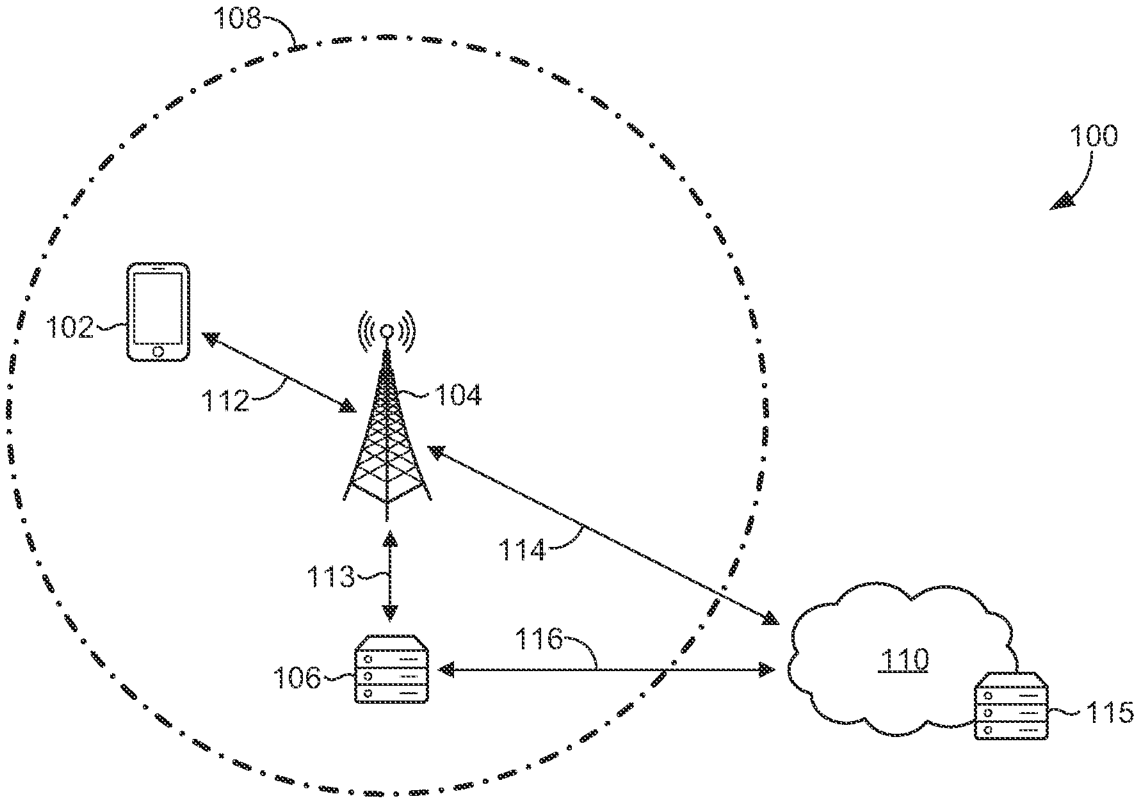
FIG. 1 is a diagram illustrating a network environment in which aspects of the present disclosure may be implemented.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton’s Telecom Dictionary, (e.g., 32d Edition, 2022). As used herein, the term “network access technology (NAT)” is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term “node” is used to refer to an access point that transmits signals to a UE and receives signals from the UE in order to allow the UE to connect to a broader data or cellular network (including by way of one or more intermediary networks, gateways, or the like)

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

By way of background, when a user equipment (UE) served by a telecommunications network makes a request for data, that data request is fulfilled by centralized servers and processors that may be physically (or electronically) distant from the UE. Delays in computing time, due to latency or network congestion, can negatively impact the user's experience. Edge computing systems focus on reducing latency and network congestion by processing data requests closer to the mobile network edge. Edge computing replaces centralized network computing, with decentralized and localized edge servers, which perform the same task for user devices within a proximate geographic area. During edge computing, the UE employs an application on a particular edge server-known as an "edge instance," certain relevant information, known as context, may also be stored at the particular edge server. In mobile edge computing, wherein the user device may be traveling through different parts of a mobile network, a user device may access different edge instances while using an application or services.

Conventionally, when a user device enters the periphery between a first geographical area where edge computing on UEs in that area is performed at a first edge server and a second geographical area where edge computing on UEs in that area is performed at second edge server a second edge instance is started at the second edge server and the context from the first edge server is transferred to a second edge server. The transfer of context from the first edge server to the second edge server is reactive to the user device entering the second edge environment. Due to the reactive nature of the transfer from the first server to the second edge server, performance of the edge computing declines during the initial movement of the user device into the second area associated with the second edge server because the second edge server lacks the stored context that was, presumably, stored at the first edge server. Uploading context from the first edge server or from another server on the network and downloading it to the second edge server takes time and may be delayed by limitations of the network, a delay which nullifies the timing benefits of processing data requests using the second edge server. Further, when the user device is configured to utilize mobile edge computing resources and does not receive requested context quickly enough from the second edge server, it may expend processing (and network) resources to re-request the context. More impactful on the network than wholly moving from the first area to the second area is a user device remaining within the periphery between the first geographic area and the second geographic area may repeatedly initiate edge server instances and transfer context between the two edge servers-compounding the poor performance that results from a context/instance being in the wrong place at the wrong time.

In contrast to conventional solutions and to reduce latency and preserver network resources the user's experience, the present disclosure is directed to systems and methods to anticipate which edge environments a user device might enter and caching or maintaining some or all of the context on multiple edge servers depending on network rules and available resources. The first edge server develops a list of qualified edge servers that are adjacent to the first edge server. User device location, network usage history, and other relevant information may then be used to identify a targeted set of edge servers from the list of qualified edge servers that are likely to be invoked by the user device. The present disclosure may further preserve network resources by prioritizing context to be transferred to the other servers, by dividing the context into categories and applying a different set of pre-caching rules to each category. Communal context may be information that is used between common apps and services that is loaded on a plurality of edge servers and may be accessible to a plurality of user devices. Public context may be information that is application or service-specific but commonly used by multiple user devices that should be readily accessible by the edge server and will be pushed out to the edge servers on the priority list as network rules permit. Private context is particular to a particular user device's session and is mobilized only immediately prior or during the transition between edge instances in response to a data request from the particular user device.

As used herein, user equipment (UE) (also referenced herein as a user device or UE device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station.

A first aspect of the present disclosure is a system for dynamically transferring user data between edge servers based on predicted need. The system comprising two or more radio access network nodes. The system further comprising one or more computer processing components configured to perform operations. The operations comprising receiving a request to start an edge instance, storing context data, and determining the location of the UE within an edge geographic area. The operations additionally comprising determining the location of the UE is within a periphery of the edge geographic area, querying a database of historical location and duration data for the UE, and identifying geographically adjacent edge servers. The operations further comprising preparing a priority list of geographically adjacent edge servers based on the historical location and duration data and caching context data on the geographically adjacent edge servers in accordance with the priority list.

A second aspect of the present disclosure is a computer-readable storage media having computer-executable instructions embodied thereon, when executed by one or more processors, cause the processors to perform. The processors receive a request from the UE to utilize edge services, store context data on a first edge server, and determine the geographical location of the UE is proximal to a perimeter of a first edge server. The processors additionally determine the geographical location of the UE is proximal to a perimeter of a first geographical area, query a stored dataset of the UE's historical location and duration history, and develop a list of adjacent edge servers. The processors further determine a priority list of edge servers by analyzing the stored dataset to refine the list of adjacent edge servers and cache a portion of the context data on at least one edge server from the priority list.

Another aspect of the present disclosure is a method for performing predictive and dynamic user context transference. The method comprises receiving a request for edge services on a first edge server from the UE, storing context data on the first edge server, and determining the UE's location within a first geographic area serviced by the first edge server. The method additionally comprises determining the UE's location is within a periphery of the first geographic area, compiling a data set of historical location and duration data for the UE, compiling a list of adjacent edge servers. The method further comprises computing a priority list of qualified edge servers by applying the data set to refine the list of adjacent edge servers and caching a portion of the context data on at least one adjacent edge server based on the priority list.

An additional aspect of the present disclosure is a method for predictive and dynamic user context transference. The method comprises requesting edge services from a first edge server, offloading computing processes to the first edge server, and storing context data at the first edge server. The method additionally comprises determining the UE's geographical location, determining that the UE is located within a geographical boundary region of the first edge server, and retrieving the UE's location and duration data for being located within a geographical area of first edge server. The method further comprises compiling a list of adjacent edge servers to the first edge server, refining the list to a priority list of adjacent edge servers, and requesting the context data be shared from the first edge server to one or more edge servers on the priority list of adjacent edge servers.

Turning now to FIG. 1, edge environment 100 is a network edge environment (hereinafter "edge environment") in which implementations of the present disclosure may be employed. Edge environment 100 is one example of a suitable edge environment and is not intended to suggest any limitation as to the scope of use or functionality of the present disclosure. Neither should the edge environment be interpreted as having any dependency or requirement relating to any one or combination of components illustrated.

The edge environment 100 of FIG. 1 includes a user device alternatively referred to as a user equipment (UE) 102, a network node 104, an edge server 106, a geographic edge area 108, and a network 110. The geographic edge area 108 may be referred to as the "geographical area," "first edge area," "edge area," "coverage area," or "coverage footprint" of the network node or cell site as used interchangeably hereinafter. Although depicted as a cellular phone the UE 102 may take on a variety of forms, such as a PC, a user device, a smart phone, a smart watch, a laptop computer, a mobile phone, a mobile device, a tablet computer, a wearable computer, a connected vehicle, a device connected through another device by means of a secondary connection, a PDA, a server, a CD player, an MP3 player, GPS device, a video player, a handheld communications device, a workstation, a router, an access point, and any combination of these delineated devices, or any other device that communicates via wireless communications with a network node 104 in order to interact with network 110, which may be a public or a private network.

In some aspects, the user equipment 102 corresponds to a user device or a computing device. For example, the user device may include a display(s), a power source(s) (e.g., a battery), a data store(s), a speaker(s), memory, a buffer(s), a radio(s), and the like. In some implementations, the user equipment 102 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the user equipment 102 in edge environment 100 may optionally utilize network 110 to communicate with other computing devices (e.g., a mobile device(s), a server(s), a personal computer(s), etc.) through network node 104. The network 110 may be a telecommunications network(s), or a portion thereof. A telecommunications network might include an array of devices or components (e.g., one or more base stations), some of which are not shown. Those devices or components may form network environments similar to what is shown in FIG. 1 and may also perform methods in accordance with the present disclosure. Components such as terminals, links, and nodes (as well as other components) may provide connectivity in various implementations. Network 110 may include multiple networks, as well as being a network of networks, but is shown in more simple form so as to not obscure other aspects of the present disclosure.

Network 110 may be part of a telecommunication network that connects subscribers to their service provider. In aspects, the service provider may be a telecommunications service provider, an internet service provider, or any other similar service provider that provides at least one of voice telecommunications and/or data services to UE 102 and any other UEs. For example, network 110 may be associated with a telecommunications provider that provides services (e.g., LTE) to the user equipment 102. Additionally or alternatively, network 110 may provide voice, SMS, and/or data services to user devices or corresponding users that are registered or subscribed to utilize the services provided by a telecommunications provider. Network 110 may comprise any communication network providing voice, SMS, and/or data service(s), using any one or more wireless communication protocols, such as a 1× circuit voice, a 3G network (e.g., CDMA, CDMA2000, WCDMA, GSM, UMTS), a 4G network (WiMAX, LTE, HSDPA), or a 5G (NR) network. The network 110 may also be, in whole or in part, or have characteristics of, a self-optimizing network.

Network node 104 may be any gateway between a UE 102 and a network 110, wherein the UE 102 cannot communicate directly with the network. In some embodiments, the network node 104 may be an optical line terminal (OLT) or a fiber node in a fiber optic network. In some embodiments, the network node 104 may be part of a radio access network (RAN) configured to transmit and receive radio signals. The UE 102 may communicate with the network 110 via the RAN over one or both of uplink (UL) radio frequency (RF) signals and downlink (DL) radio frequency (RF) signals through the network node 104.

In some implementations, network node 104 is configured to communicate with the UEs 102 that are located within the edge area 108 as defined by a transmission range and/or receiving range of at least one radio antennae. Network node 104 may include one or more base stations, base transmitter stations, radios, antennas, antenna arrays, power amplifiers, transmitters/receivers, digital signal processors, control electronics, GPS equipment, and the like. In particular, network node 104 may be configured to wirelessly communicate with devices within a defined and limited geographical area. For the purposes of the present disclosure, it may be assumed that it is undesirable and unintended by the network 110 that the network node 104 provide wireless connectivity to the user equipment 102 when the user equipment 102 is geographically situated outside of the edge area 108 associated with the network node 104.

In an aspect, the network node 104 comprises a base station that serves at least a portion of edge area 108 and at least one transmit antenna for propagating a signal from the base station to one or more of the user equipment 102. In other aspects, the network node 104 may comprise multiple base stations and/or multiple transmit antennas for each of the one or more base stations, any one or more of which may serve at least a portion of the cell. In some aspects, the network node 104 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more as measured at ground level and extending outward from an antenna at the cell site. In another example, a small cell may correspond to a coverage area having a radius of approximately less than three miles as measured at ground level and extending outward from an antenna at the cell site.

The user equipment 102 may offload computing workload to the network 110, this process may be referred to as "cloud computing." In cloud computing, the UE 102 may utilize a remote server 115 located on the network 110 to store, manage, and process data for the UE 102. The remote server 115 may be a server connected to the network 110 and may be located geographically at great distance from the UE 102. Data may be communicated from the remote server 115 across the network 110 to the UE 102. To facilitate communication the data may be transmitted from the network 110 along a network link 114 to the network node 104. The data is transmitted from the network node 104 along a communications link 112 to the UE 102. The UE 102 may request cloud computing services from the network 110. The network 110 may also initiate cloud computing services for the UE 102 or an application running on the UE 102. Geographic distances between the remote server 115 and the UE 102 may increase latency and cause performance to suffer. Additionally, data transmission through the network 110 may cause increased latency and poor performance.

In the edge environment 100 the network node 104 is in communication with both the edge server 106 and the network 110, the edge server 106 is also in communication with the network 110, either separately via a backhaul connection 116 or via the network node 104. When the UE 102 engages in cloud computing services with the network 110, and the network node 104 is within an edge environment 100 as depicted in FIG. 1, cloud computing may be performed by the edge server 106 instead of a remote server 115. The edge server 106 may communicate with one or more remote server 115 to gather data or receive data processed at the remote server 115. The edge server 106 may be in close geographic proximity to the network node 104. The edge server 106 may be located at the base station or otherwise within the edge area 108. When data is communicated from the edge server 106 to the UE 102, the data may be transmitted along an edge link 113 and transmits to the UE from the network node 104 along the communications link 112.

Figure 2A:
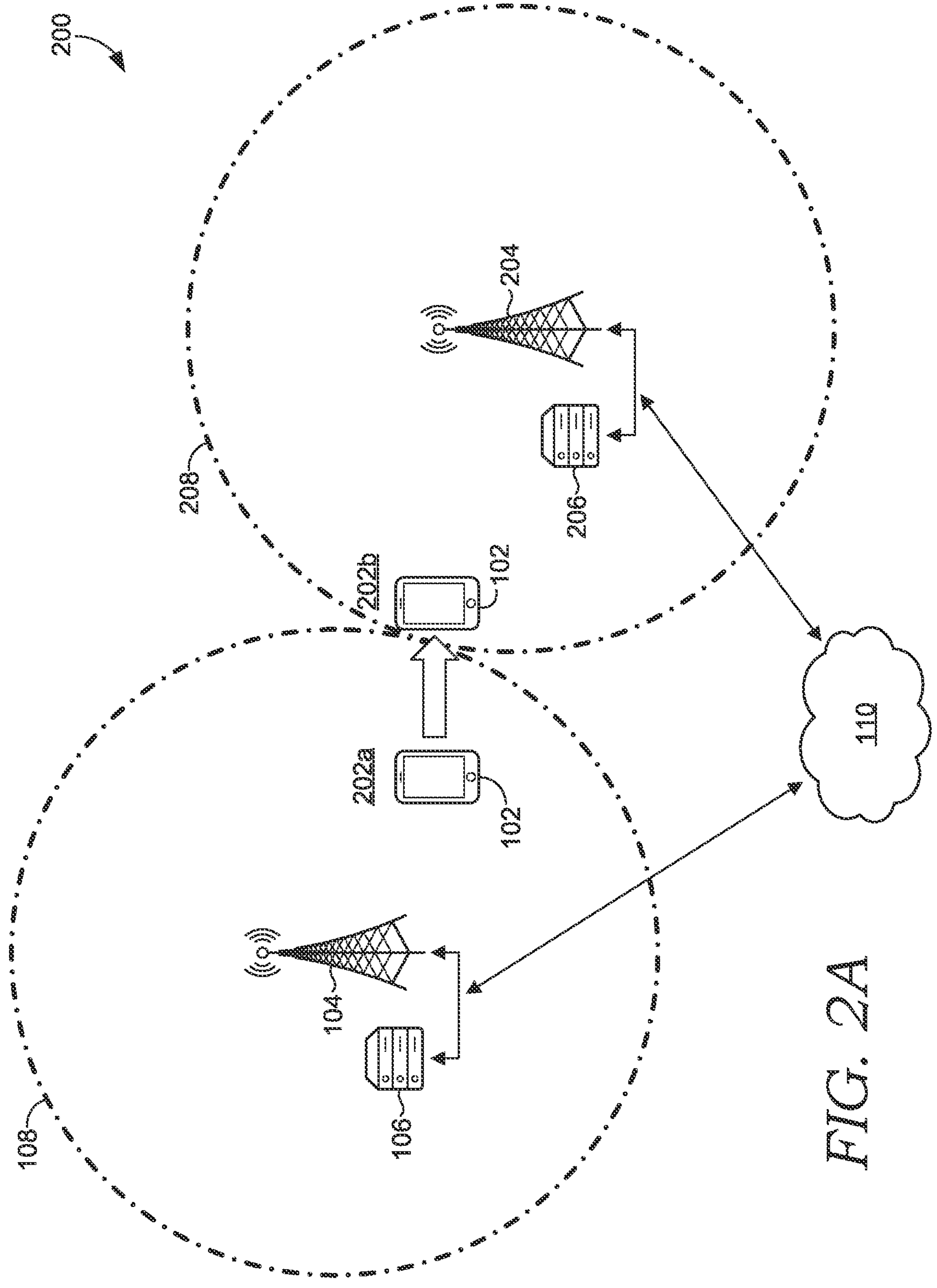
FIG. 2A is a diagram illustrating a network environment where a user equipment is moving from a first geographical area to a second geographical area.

Edge computing may be beneficial to reducing latency and optimizing cloud computing for the UE 102 within the edge area 108, however when the UE 102 leaves the edge area 108 latency may increase if the computing is performed on the edge server 106. FIG. 2A, illustrates the UE 102 leaving a first edge area 108 for a second edge area 208 in an edge environment 200. Stored data at the edge server 106 reduces latency in edge computing, therefore it may be transferred from the first edge server 106 to a second edge server 206 (as illustrated in FIG. 2A). Until the data is either transferred or re-generated at the second edge server 206, the UE 102 will experience greater latency for edge services.

Figure 2B:
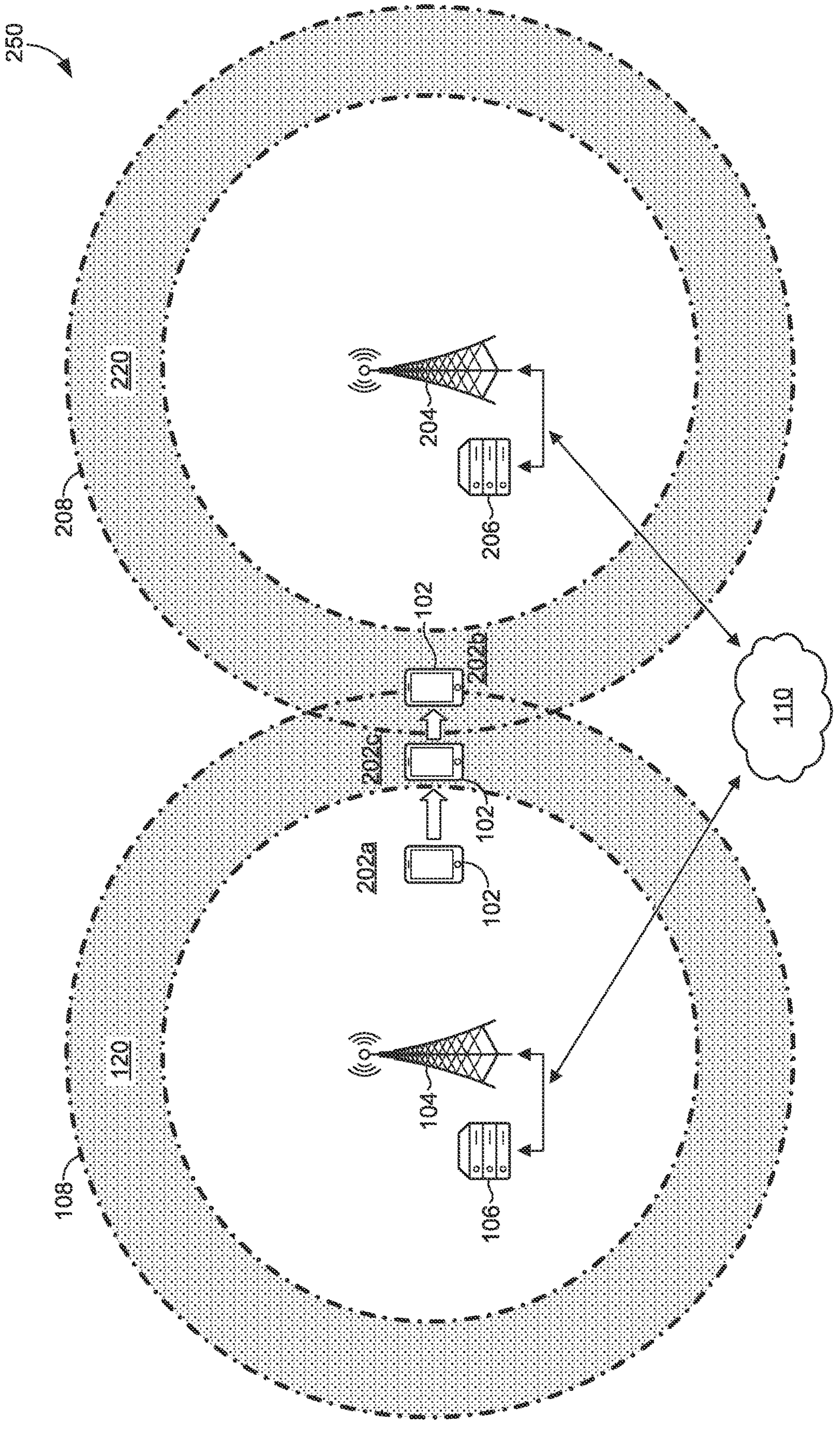
FIG. 2B is a diagram illustrating a network environment where a user equipment is moving from a first geographical area to a second geographical area using predictive caching.

An example of the present invention is described in FIG. 2B. FIG. 2B depicts an edge environment 200 where the UE 102 is moving from a first position **202*a* in the first edge area 108 to a second position 202*b* in the second edge area 208, where the edge servers may be utilizing predictive context caching. Predictive context caching may be enabled by one of the edge servers 106 and 206, the node 104, the network 110, the remote server 115, or a separate caching apparatus. Each edge area may have a peripheral area, where the peripheral area is a portion of the edge area as determined by the network operator. The peripheral area may be where the presence of the UE triggers special edge processes of the present disclosure. The peripheral area may also be a static geographic area or a dynamic geographic area which adjusts based on the needs of the network. In this illustration, the first edge area 108 includes a predetermined area along the perimeter of the edge area 108 known as a peripheral area 120. The second edge area 208 also includes a predetermined area along the perimeter of the edge area 208 known as a peripheral area 220. Data stored by the edge server 106 may be referred to as context. Context may include different types of data. For example, context made available for a plurality of UEs engaging edge services on the edge server 106 may be called "public context" or "local context." Public context may include geographical locations of relevant buildings, highways, or events. Public context may include data like weather conditions, traffic conditions, or similar data relevant throughout the edge area 108. Context may be generated and stored at each edge server 106, 206 and may or may not be transferred to the second edge server 206. Context that is particular to a particular user or UE 102 may be referred to as "private context," "device context," or "user context" interchangeably. Examples of private context includes to device identifier data, application data, user data, and data being generated by an application for a specific user. The private context may be transferred from the first edge server 106 to the second edge server 206 as the UE 102 moves through edge environments 100. In alternative aspects, the private context may be generated at the second edge server 206, which may cause latency, poor performance, or a burden on network 110 resources. Context may include other types of data, such as data that is application specific or event specific, which may be referred to "general context" or "application wide context" interchangeably. Examples of general context may include application specific data shared across a plurality of user equipment 102**.

Prior to the UE 102 moving from the first position **202*a* to the second position 202*b*, the UE 102 connects to the edge server 106 and requests edge services. The edge server 106 or the node 104 will determine the UE's 102 location. The location of the UE 102 may be determined from information received from the UE 102, such as GPS information, Wi-Fi location information, stored known locations, and other methods known for UEs 102 to determine their own location. Further, the node 104 may determine the UE's 102 location. After the UE 102 may be determined to be within the edge area 108, edge services may be provided by the edge server 106 to the UE 102. First position 202*a* is within the edge area 108. The UE's 102 location may be tracked while the UE 102 is within the edge area 108. The time that the UE 102 spends at locations within the edge area 108** may be tracked as a duration data.

Both the position and the duration of the UE 102 may be stored on a database on the network 110. The historical location and duration information may be retrieved from the database on the network 110. When the UE 102 moves within the edge area 108 to the peripheral area 120 the predictive context caching process may begin.

Once the UE 102 is determined to be within the peripheral area 120, a list of adjacent edge servers may be compiled. The edge server 106, the node 104, or the UE 102 may prepare the list of adjacent edge servers. In some aspects, an adjacent edge server may be a server located at a node, which has a geographical service area that overlaps or abuts the edge server 106. In another aspect, the list of adjacent edge servers may be formed from edge severs located at a node located within a particular distance to the node 104. In some aspects, the adjacent server list may be a list of edge severs located within a particular distance to the UE 102. In other aspects, the list of adjacent edge servers may be defined by the network operator for the node 104. In additional aspects, the list of adjacent edge servers may include edge servers with assigned geographical areas that do not correspond with only one node. It is contemplated that the list of adjacent edge servers may be from any combination of the preceding descriptions.

The list of adjacent edge servers may be qualified by a home public land mobile network (HPLMN). The HPLMN may determine if the edge servers on the list of adjacent edge servers are in the same network or have partner agreements with a network operator of the network 110. The network operator may mark adjacent servers as not qualified for particular users, plans, partner agreements, or mobile virtual network operator (hereinafter "MVNO") customers. For example, a plan may be a service agreement plan between the network operator and the user. The network operator may offer a lower priority plan which provides a lower tier of services offered, including edge services. In another example, an edge server may be not qualified for MVNO customers or customers on the lower priority plan during periods of high demand. In further aspects, the network operator may have a partner agreement with a second network operator which may provide or limit services in certain areas, such as edge services. The list of qualified adjacent edge servers may be maintained at the edge server 106 or the node 104.

A priority list of qualified adjacent edge servers may then be formed from the qualified list of adjacent edge servers. The priority list of qualified edge servers maybe hereinafter referred to as the "priority list," or the "priority edge servers list," or the "priority list of edge servers." The priority may arrange adjacent edge servers to enable the edge server 106 to transmit preferentially the context data. The priority list may rank the qualified adjacent edge servers in a discrete list. The priority list may be a single qualified adjacent edge server or a plurality of qualified adjacent edge servers. The priority list may be one or more levels of priority, where each level of priority may have one or more servers on it. For example, the priority list may be determined, at least in part, by the historical location and duration data from the database on the network 110. In some aspects, the priority list may also be determined, at least in part, by the UE's 102 location and duration data from the current edge session. The location and duration data may be used to predict where the UE 102 is likely to move to next, out of the geographical locations serviced by qualified edge servers. For example, it may be determined the UE 102 may be more likely to move into an area not served by a qualified adjacent edge server, however the priority list may include the next location most likely for the UE 102 to enter. In some aspects, the priority list may return no edge servers, as it is determined that it is unlikely the UE 102 will enter into another edge server geographical area. In other aspects, the priority list may be determined in at least part by the network conditions. For example, the network operators may set a threshold on network resources for sharing context to more than one qualified adjacent edge server. In other examples, the network conditions may be a factor in determining the number of edge servers on the priority list. Other factors may include the UE's 102 current subscription plan, whether the UE 102 is a MVNO customer, or sensitivity of the UE's 102 edge services to latency. The priority list may be based on a number of factors including, network availability, amount of context data to be transferred, ease of recreating the context data at new edge servers, specific network slice availability and network rules. Once the priority list is established, the edge server 106 may begin transferring context data to the edge servers on the priority list.

The private context data may be transmitted from edge server 106 to edge server 206. Alternatively, private context can be re-generated at the second edge server 206 when the edge server 106 provides device and application information to the second edge server 206. Further, the edge server 106 may ensure that the second edge server 206 has the required public context for use with the current edge services. If the second edge server 206 does not have the required public context, the edge server 106 may transmit the public context or request the second edge server 206 retrieve the public context from the network 110. The edge server 106 may communicate with and transmit data or context to the second edge server 206 via the network 110 as illustrated. The first edge server 106 and the second edge server 206 may have a direct connection without utilizing the network 110. As long as the UE 102 remains in the peripheral area 120, the edge server 106 may continue to update the second edge server 206 with context data to enable a smooth transition.

Once the UE 102 leaves the edge area 108 (including the peripheral area 120) and enters the second edge area 208, the edge services may be transferred from the first edge server 106 to the second edge server 206. There may also be a period where the edge services remain at the first edge server 106. In the present example, the edge services resume seamlessly from the first edge server 106 to the second edge server 206 from the perspective of the UE 102, as the context may already be cached.

Context transfer to the second edge server 206 may be initiated in a variety of ways. The location of the UE 102 may be maintained by the edge server 106 as it travels within the first edge area 108, when the edge server 106 recognizes the UE 102 has entered into the second edge area 208 it may initiate edge services transfer to the second edge server 206. Edge services may be transferred based on another triggering event other than the edge server 106 requesting it. The transfer of edge services may be initiated by either one of the nodes 104 or 204 determining that the UE 102 has entered into the second edge area 208. The nodes 104 or 204 may initiate this by communicating the UE's 102 location to the first edge server 106 or to the second edge server 206 which communicates with the first edge server 106. The UE 102 may track its own location and track signal strength and quality to determine when it may request a transfer of edge services.

In some aspects, pre-caching the context data from edge server 106 to edge server 206 improves the user experience for the user of UE 102. For example, by pre-caching the context data the user may experience a seamless transition between the edge servers 106 and 206 without experiencing disruptions. In other aspects, pre-caching may allow for the first edge server 106 to more easily shift processing to the second edge server 206 during periods of high congestion at the first edge server 106. In another aspect, the network 110 may adjust to demand by allocating and de-allocating (scale up/down, scale in/out) edge servers to add capacity near the UE 102. In some aspects, data processing may be optimized to enable the distance between the UE 102 and the edge server 106 or 206 is reduced rendering an improved performance. 6. Adaptability to network conditions: This is related to the previous point it will help with optimizing performance and reliability.

Figure 3:
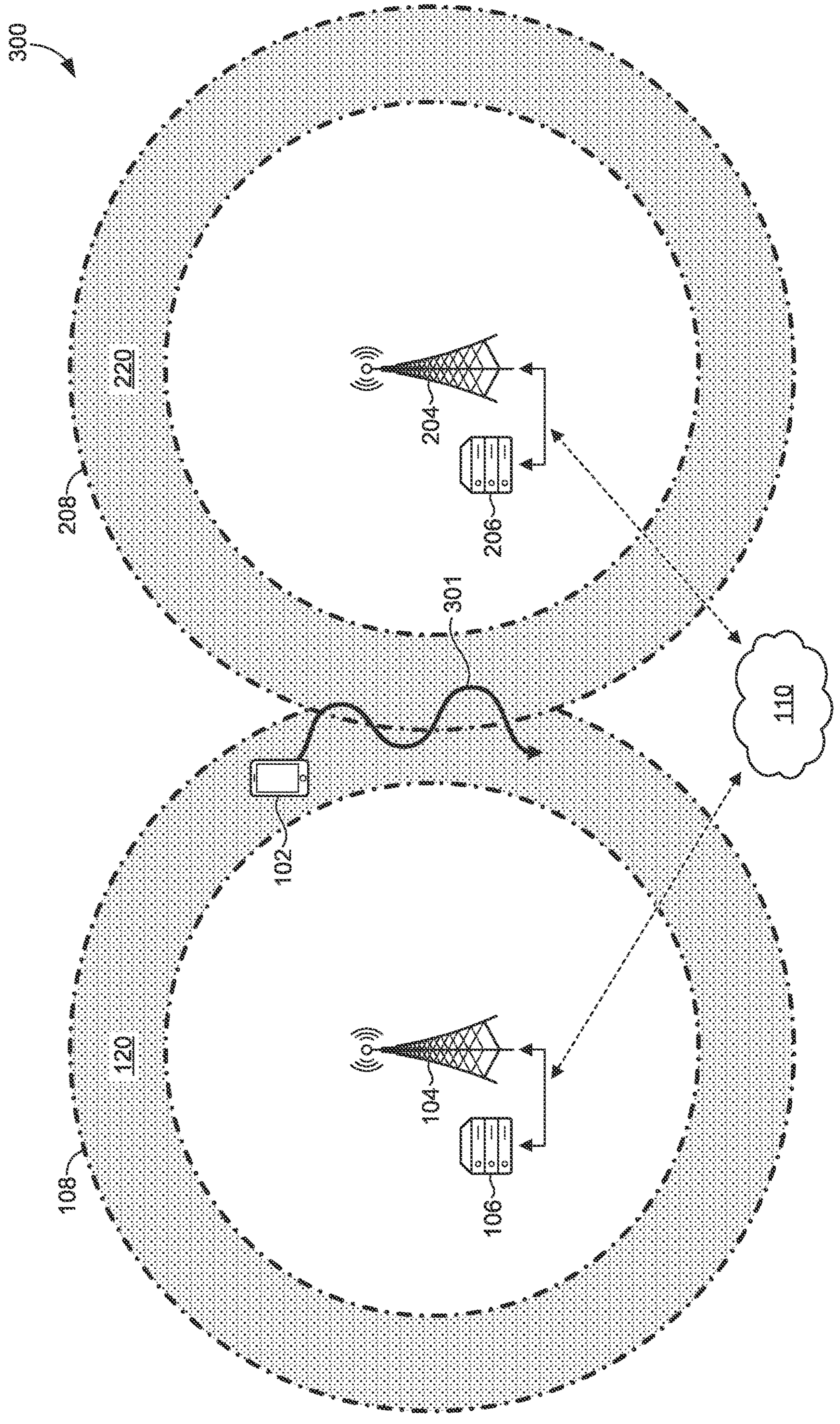
FIG. 3 is a diagram illustrating a network environment where a user equipment remains in a transition area between a first geographical area and a second geographical area.

FIG. 3 depicts an edge environment 300 where the UE's 102 historical location and duration data may be used to predict whether the UE 102 will stay within the first edge area 108 or shortly return to it as it is moving along a meandering path 301. The UE 102 device may stay in a transition area between the first edge server 106 and the second edge server 206. Using predictive caching context may be efficiently shared between first edge server 106 and the second edge server 206. Context may be shared from the first edge server 106 and the second edge server 206. The shared context may also include the historical location and duration data and the determination made that the UE 102 may be likely to stay or return to the first edge area 108.

The UE 102 may travel into the second edge area 208 while traveling along the meandering path 301. In one example, telecommunications services may be maintained at the first node 104 despite the UE 102 traveling into the second edge area 208. In another example, telecommunications services may be transferred to the second node 204 when the UE 102 travels into the second edge area 208, but the edge services may be maintained at the first edge server 106. Alternatively, telecommunications services may be transferred to the second node 204 and the edge services transferred to the second edge server 206 when the UE 102 enters the second edge area 208. The outcome may change depending on individual factors network rules, the network conditions at the time, and the calculated probability that the UE 102 will return to the first edge area 108, and.

The second edge server 206 may also determine the UE's 102 location prior to or after providing edge services to the UE 102. The historical location and duration data may be retrieved from the network 110, if not already received from the first edge server 106. A new priority list edge servers may be determined using the methods described in reference to FIG. 2A, from the perspective of the second edge server 206. Thus, if the meandering path 301 takes the UE 102 between the two edge areas 108 and 208 and the context may be cached at both the first edge server 106 and the second edge server 206 to reduce latency.

Figure 4:
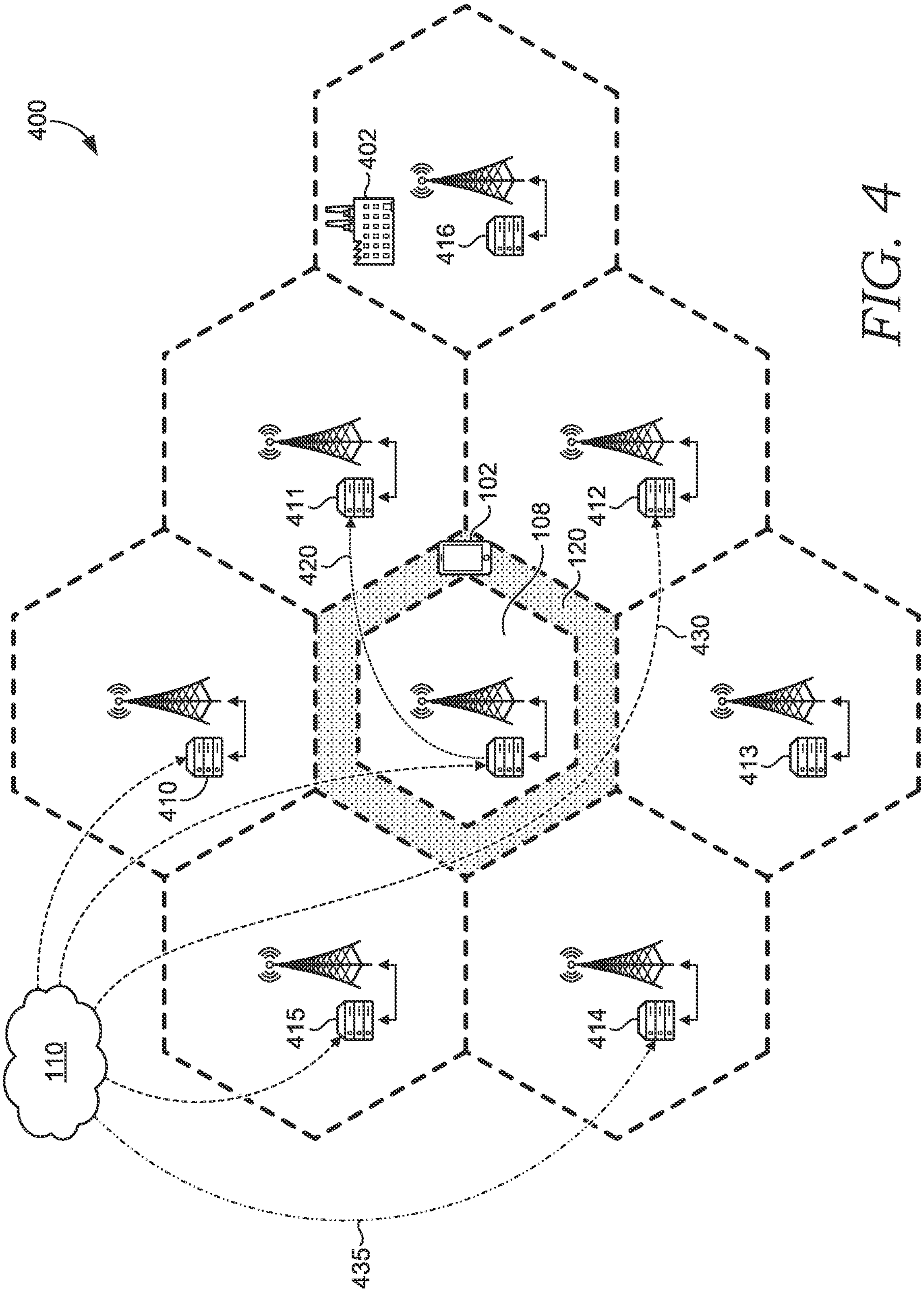
FIG. 4 is a diagram illustrating a network environment where a user equipment may move to a plurality of edge servers.

In FIG. 4 a network environment is illustrated where a UE 102 may move to a plurality of edge servers. The UE 102 may be within the first edge area 108 and within the first peripheral area 120. The first edge area 108 may be surrounded by at least one other node within an edge area on each side. For convenience and ease of understanding, the edge areas have been represented as hexagons, it should be understood that the actual edge area may vary considerably due to geography, terrain, signal limitations, load demands, node capabilities, and other reasons not explicitly laid out.

The network environment 400 is illustrated with a plurality of edge servers. In addition to comprising the edge server 106, UE 102, edge area 108, and peripheral area 120, the network environment 400 includes a north edge server 410, northeast edge server 411, southeast edge server 412, south edge server 413, southwest edge server 414, northwest edge server 415, and far edge server 416. In aspects where adjacent edge servers are determined based on which have an overlapping peripheral area, each of edge servers 410-415 would qualify as an adjacent edge server. Whereas, the adjacent edge server list would not include the far edge server 416. In other aspects, far edge server 416 may qualify as an adjacent edge server as the UE 102 is close in proximity to the far edge server 416. Each edge server listed herein 410-416 may be consider to be an edge environment 100 as described in FIG. 1, centered around a node and an edge server.

The edge servers 410-415 in the list of adjacent edge servers may be qualified by the HPLMN. In FIG. 4, the south edge server 413 may be not qualified by the HPLMN. There may be various reasons why the HPLMN may not qualify an adjacent edge server such as those discussed regarding FIG. 2B. The south edge server 413 may have also been unavailable for another reason and thus the HPLMN disqualified the south edge server 413.

The UE's 102 historical location and duration data may be queried from the database on the network 110. The priority list of qualified adjacent edge servers may be developed. The priority list of qualified adjacent edge servers may be based on current location of the UE 102, network conditions, or other data available may be generated. In the example in FIG. 4, the northeast edge server 411 and the southeast edge server 412 may be prioritized over the other qualified adjacent edge servers because of their proximity to the current location of the UE 102. Additionally, account network burden and resources may be taken into consideration when refining the priority list. For example, the southeast edge server 412 may be prioritized even further than the northeast edge server 411, as the edge server 106 is connected to the southeast edge server 412 through the network 110 via a network connection 430 versus a direct connection 420 to the northeast edge server 411. In other aspects, the northeast edge server 411 may be prioritized, as the edge server 106 is connected directly via the direct connection 420 built to facilitate the frequent edge services transfers between the two edge servers.

The priority list of edge servers may be used to determine to which edge server context should be transferred. The edge server 106 may share private context with the northeast edge server 411 and the southeast edge server 412 before other edge servers. The priority list may facilitate the sharing of context between edge servers in a manner that consumes less network resources. An edge server may be eliminated from the priority list based on a predictive algorithm. The predictive algorithm may perform user behavior analysis based on the UE's 102 historical and location data to determine if there is correlation between the UE's 102 current location or time and a predicted location or route. The time of the day may be compared to historical location and duration data for the purposes of pattern recognition. The predictive algorithm may be able to determine or incorporate additional information to enhance the prediction. For example, the predictive algorithm may incorporate the time of day while making the prediction, which may allow for more accurate prediction of user behaviors such as commuting during a certain time of day or engaging in recreational activities in other times of day.

Historical location and duration data of the UE 102 maybe prioritized to formulate a prediction the UE's 102 future movements for the purposes of selecting edge servers on the priority list. The prediction may allow for the removal of at least one of the edge servers from the priority list that are not adjacent to both the edge area 108 and the edge server 416. In some aspects, the edge servers away from the prediction may be given a lower priority or thresholds for transmitting cache data or updating cache data. The network 110 may be queried to determine the availability of network resources for caching data on adjacent edge servers. If network resources are more readily available, more servers may remain on the priority list. Adequate network resources available may allow for more frequent updating of the private context to the adjacent edge servers on the priority list. In this example, context data is not being on the southwest edge server 414. Although the edge server 106 and the southwest edge server 414 are still connected via the network there may be no context sharing on a southwest network connection 435.

Figure 5:
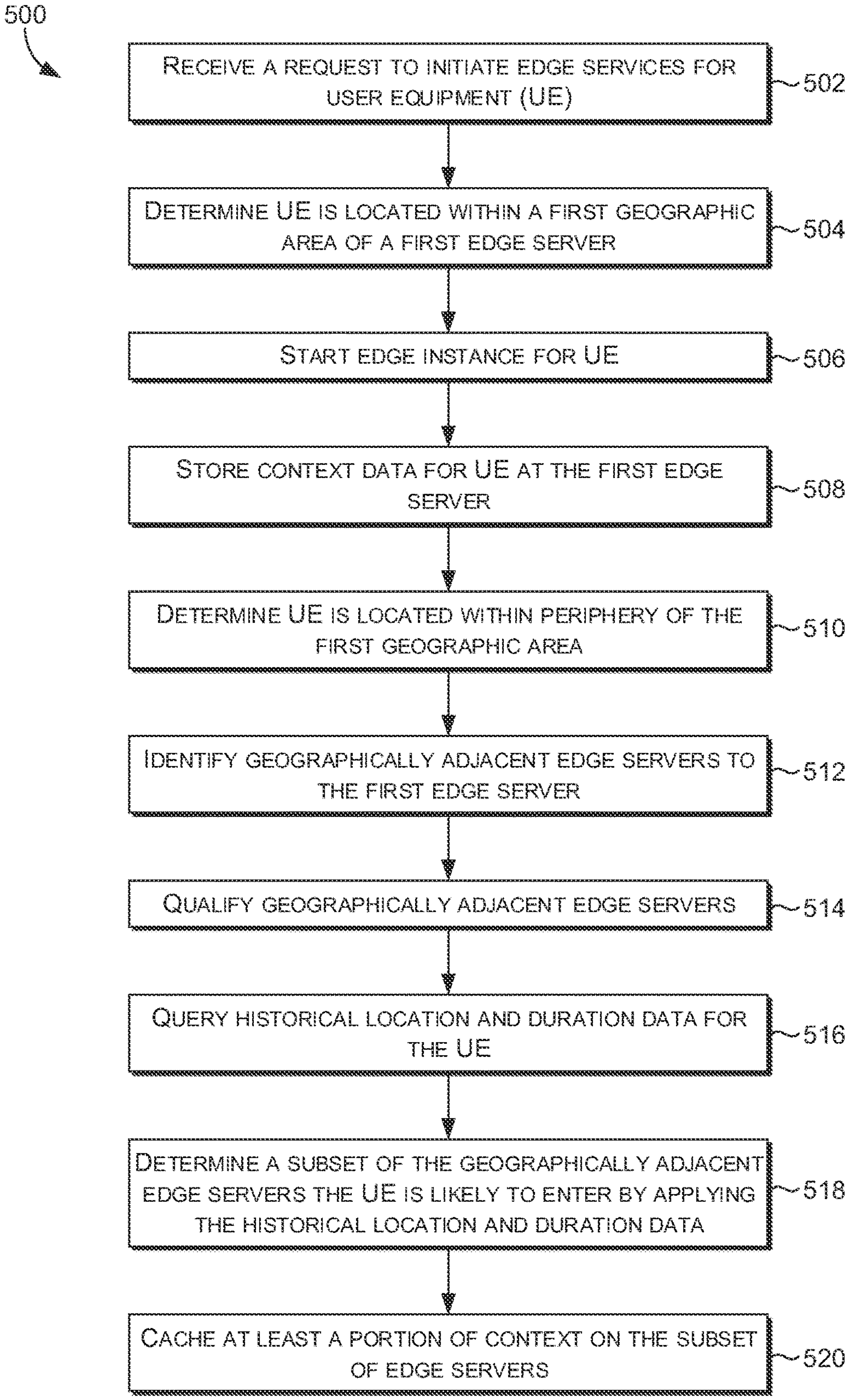
FIG. 5 is a flow chart illustrating the system of dynamically predictive context caching in adjacent edge servers.

Turning to FIG. 5, a flowchart illustrating a method 500 is provided. At a first step 502, a request is received to initiate edge services for user equipment. This may be received from the UE, from an adjacent edge server, from a network, from an application server or an application on the UE. The receiver may be an edge server, a network, or a node. In a second step 504, the UE's location may be determined within a first geographic area of a first edge server. The location of the UE may be determined a number of ways according to any one or more of the embodiments described with respect to FIGS. 1-4. In a third step 506, the edge server may start an edge instance for the UE. The edge instance may be application specific or a multitude of application processing being offloaded. In a fourth step 508, context data for the UE may be stored at the first edge server (e.g. private context data that is application, device, and edge instance specific). In a fifth step 510, the UE may be determined to be geographically located within a periphery of the first geographic area. The periphery may be determined a number of ways according to any one or more of the embodiments described with respect to FIGS. 1-4. In a sixth step 512, edge servers geographically adjacent to the first edge server may be identified. This can be a predetermined list or be queried from the network. The adjacent edge servers may also be limited to adjacent edge servers with bandwidth or load capacity. In a seventh step 514, the adjacent edge servers are qualified. Qualification may be determined by the HPLMN as discussed in reference to FIG. 2B. For one UE an adjacent edge server may be qualified and for another UE it may not be depending on plan and partner agreements. In an eighth step 516, the historical location and duration data may be queried from a database on the network. In a ninth step 518, a priority list may be formed and ordered by determining a subset of the geographically adjacent edge servers that the UE is likely to enter next by applying the historical location and duration data. This may be applied in connection with the UE's current location and other known information about the UE such as direction and velocity. In a tenth step 520, at least a portion of the context data may be cached on a subset of the geographically adjacent edge servers. This may mean that a portion of the subset of geographically adjacent edge servers receives the full context and the remaining subset receives less than the complete context or that only a portion of the context may be transmitted.

Figure 6:
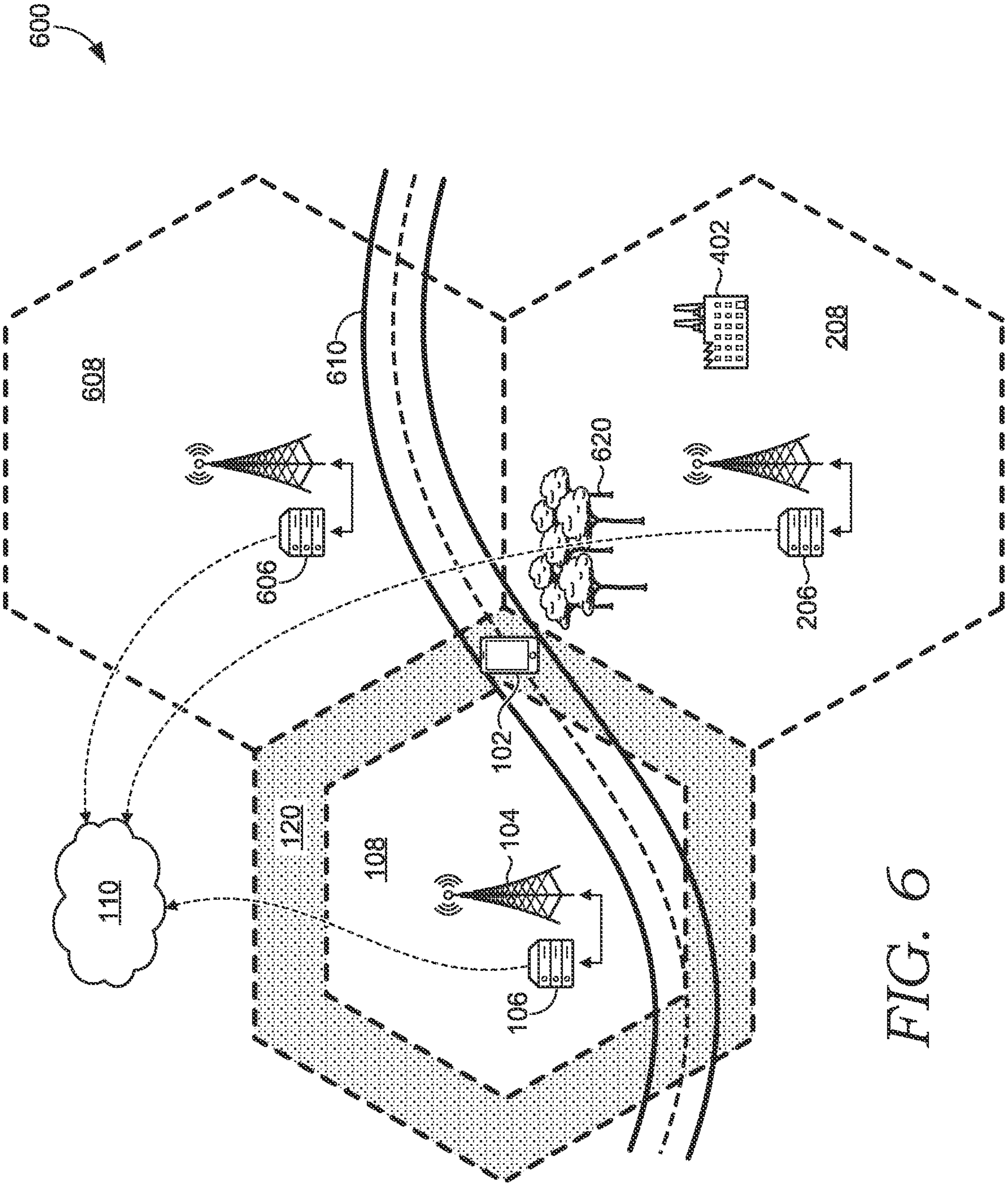
FIG. 6 is a diagram illustrating a network environment where a user equipment travels along a roadway within a periphery of a first geographical area proximate to two other geographical areas.

Turning now to FIG. 6 is a diagram illustrating the UE 102 moving in an edge environment 600 with relation to geography and transportation infrastructure. The edge server 106 may be performing edge services for the UE 102. The edge server 106 may have determined the UE's 102 location, queried the database on the network 110, and retrieved historical location and duration data for the UE 102. When the UE 102 enters into the peripheral area 120, the edge server 106 may develop apriority list in the manner described when referring to FIGS. 2B and 5. The edge server 106 may also add contextual information regarding the UE 102 and the edge area 108 to refine the priority list.

The location of the UE 102 may be maintained while the UE 102 is in in the edge area 108. The location of the UE 102 may be used in refining the priority list. The UE 102 may be detected moving at a high rate of speed and the location of the UE 102 may be determined more frequently.

Information used to help refine the priority server list that is not UE 102 specific, may be also be known as situational data, especially in the aggregate. Situational data may include geographic feature data, transportation infrastructure data, traffic and weather conditions data, and local event data. The geographic feature data may include certain geographic features (also known as "topography") contained within the edge area 108. In some aspects, the geographic feature data may include geographic locations which have known connectivity issues, where additional or alternative caching strategies should be employed. Geographic feature data may include information about impassable or infrequently passed areas including but not limited to mountains, rivers, lakes, ravines, forested areas, large industrial sites, or similar terrain. Situational data may include information regarding the geographic area of the adjacent edge servers. Situational data may include transportation infrastructure data such as information regarding roads, highways, trains, subways, buses, bridges, and ferries. Situational data may also include traffic condition and weather condition information. Traffic conditions may include real-time traffic data which may be employed to anticipate the user's route and potential delays. Such information may be used to optimize caching strategies. Situational data may also include knowledge of major events or venue use within an area around the UE 102. Situational data may include other information that is significant to predicted behaviors of user equipment. Situational data may be stored on the edge server 106, a server on the network 110, at the node 104, or at another location. Situational data may be used as part of the predictive algorithm to refine the priority list.

The UE 102 may be detected to be moving at a speed above a pre-determined threshold, which may increase the frequency at which the UE's 102 location is determined. Additional weight may be given to the location and duration data from the current edge instance if the UE 102 demonstrates movement consistent with known transportation elements. As such, adjacent edge servers, which do not conform to the expectations of the UE's 102 movement given the situational data, may be further reduced in priority on the priority list or removed from the priority list completely.

In aspects, the UE 102 enters into the peripheral area 120. One or more of the steps described in reference to FIG. 5 may be completed and a predicted destination 402 within the second edge area 208 may be determined based on the historical location and duration data. The UE's 102 position and duration data from the current edge session may be used to determine a velocity of the UE 102. The velocity of the UE 102 may allow a determination the UE 102 is moving in a manner consistent with u travelling along a highway 610. The situational data of the second edge area 208 and a highway edge area 608 may be incorporated in refining the priority list. The highway 610 may lead from the first edge area 108 to the highway edge area 608. The situational data may be used to determine the UE 102 is traveling along the highway 610 and may be still on the highway 610. It may be determined that the available exits off of highway 610 prior to leaving the edge area 108 leads to the second edge area 208.

In the present example, there may be no remaining exits on the highway 610 leading to the second edge area 208. As such, it may be determined that highway 610 travels through the edge area 108 and passes into the highway edge area 608, without passing through the second edge area 208. In other examples, it may be determined there is a forested area 620 which would further make travel difficult for the UE 102 to enter the second edge area 208. As such, despite the previously determined predicted destination 402, additional information may cause further de-prioritization or elimination of the second edge server 206 from the priority list. Situational data may be retrieved and may include a traffic condition along the highway 610. The traffic conditions may include data about the rate of speed of traffic, public transportation speeds, if there are any hazards or delays, and other data commonly associated with traffic. The highway edge server 606 may have the highest priority edge server to receive context from the edge server 106. The priority list may be further refined based on the historical location and duration data in context with the UE's 102 current behavior and other situational data.

Figure 7A:
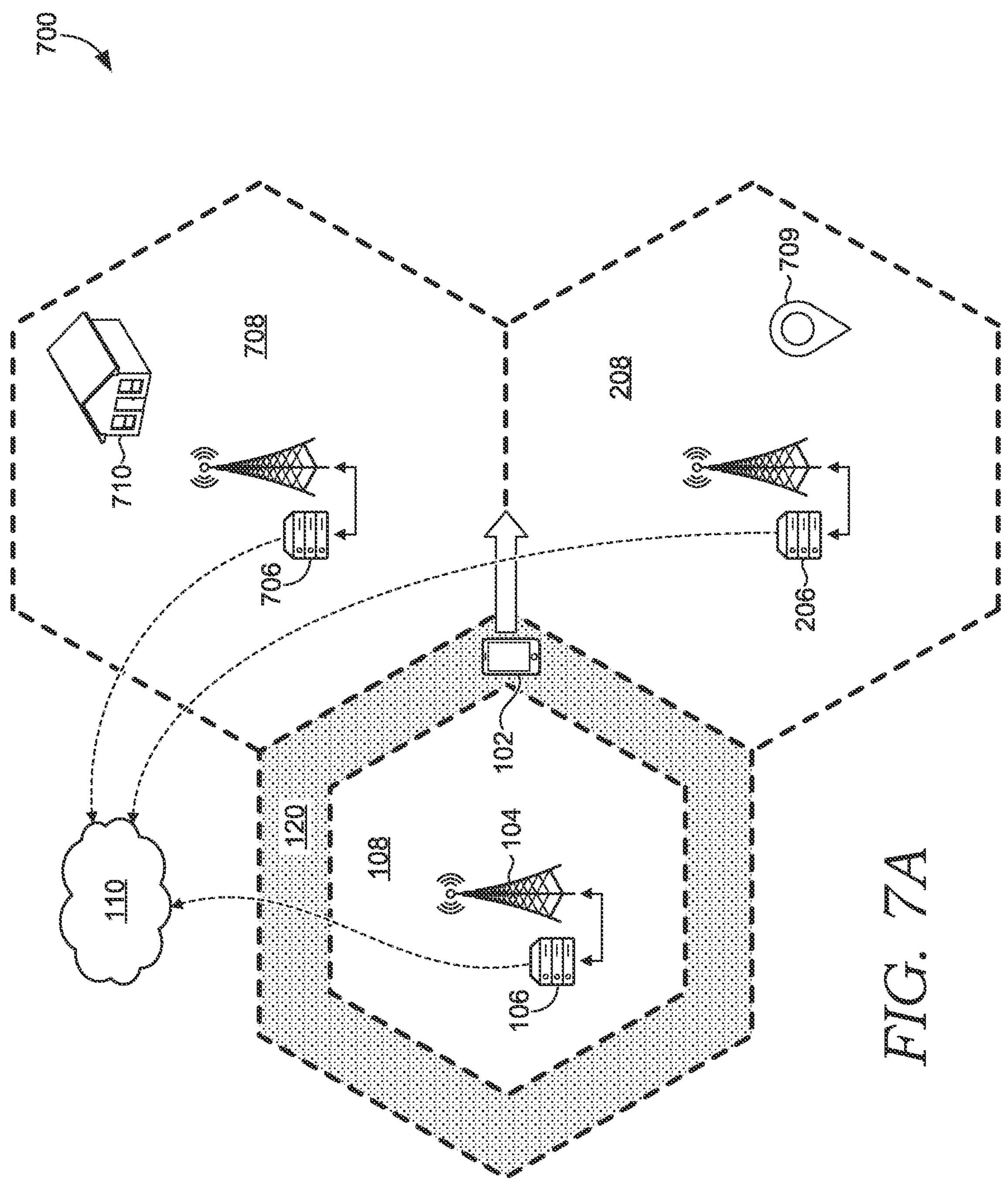
FIG. 7A is a diagram illustrating a network environment where a user equipment is moving from a first geographical area to a different geographical area using predictive caching based on historical location data and user specific information.
Figure 7B:
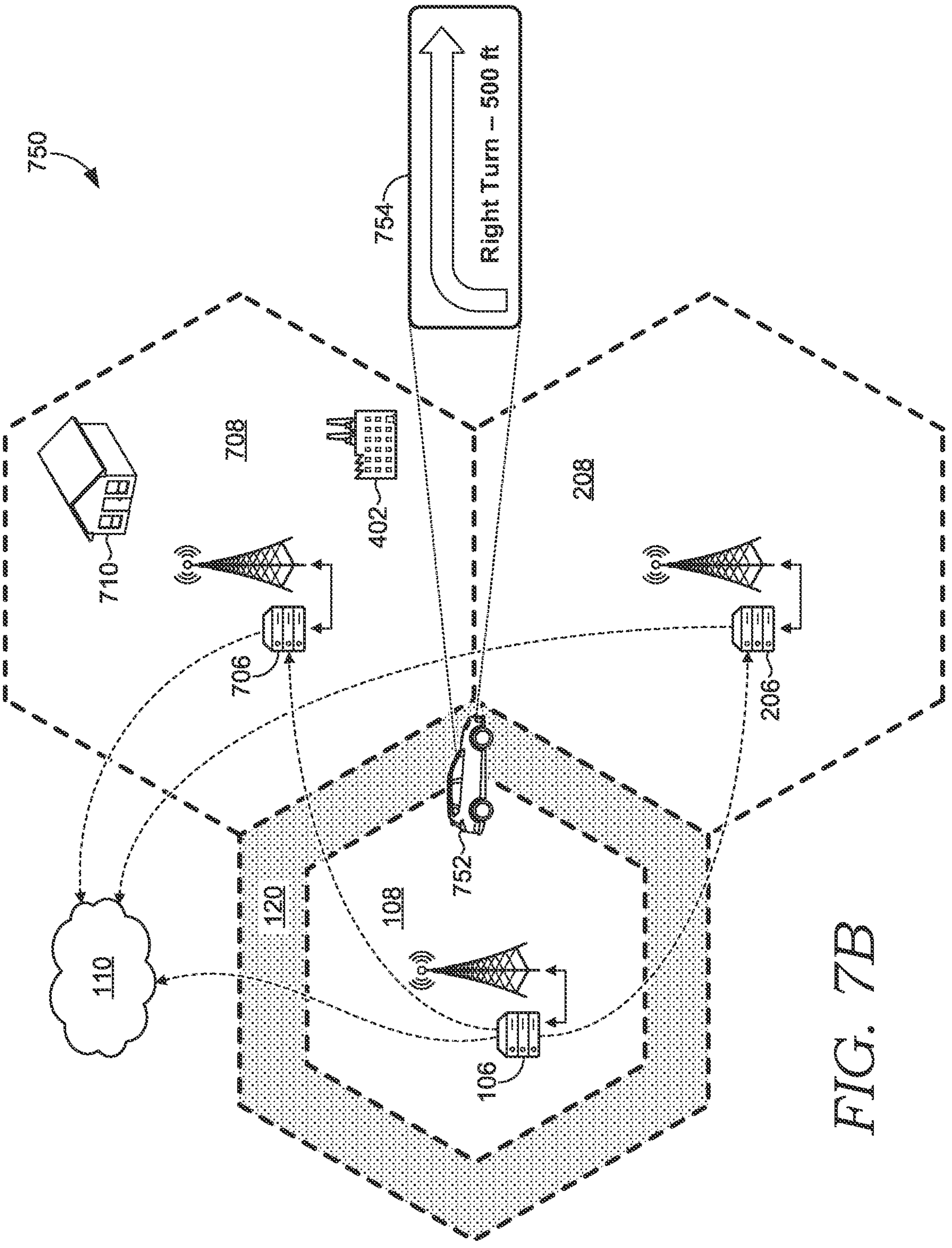
FIG. 7B is a diagram illustrating a network environment where a vehicle based user equipment is moving from a first geographical area to a different geographical area using predictive caching based on historical location data and user specific information.
Figure 7C:
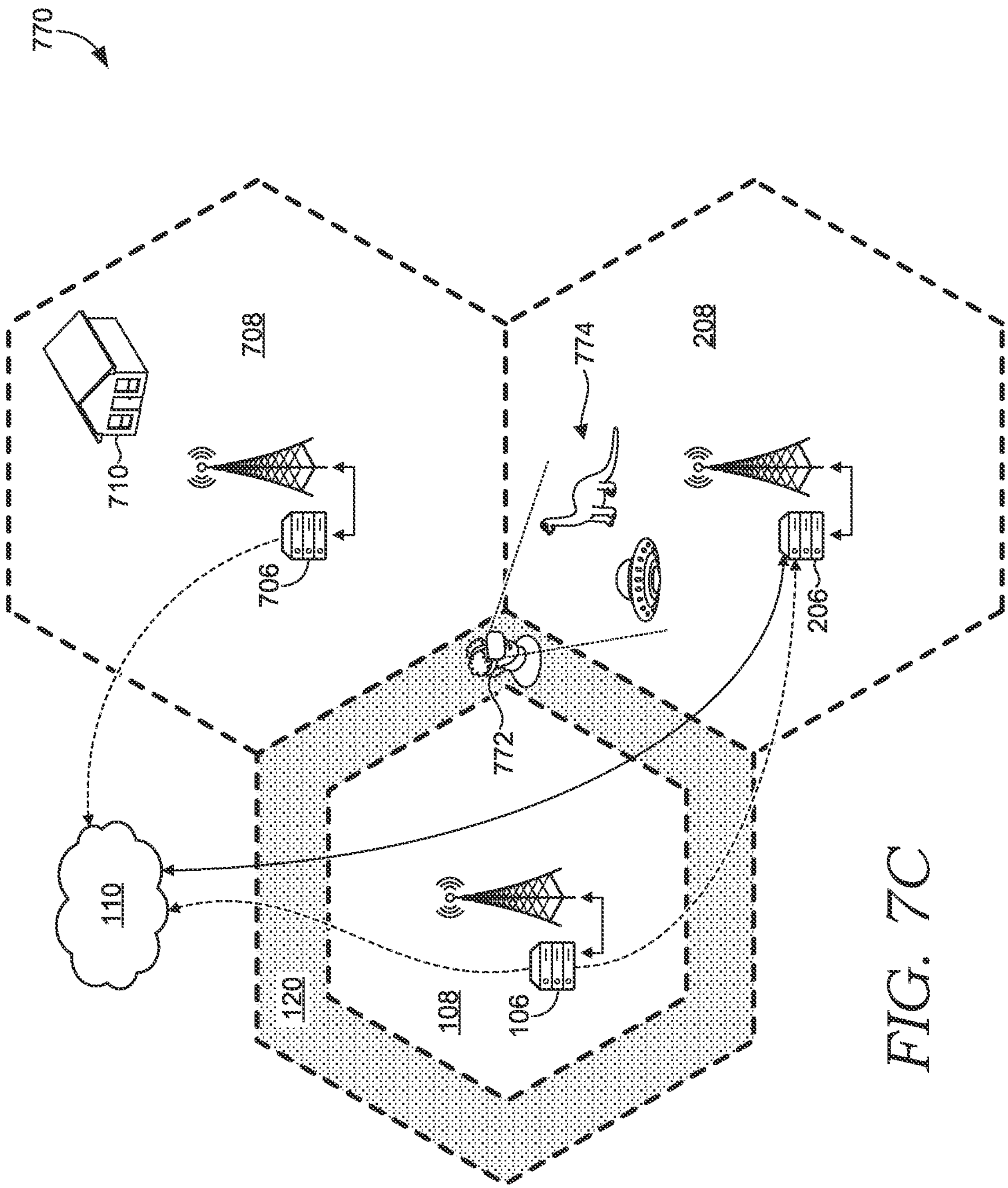
FIG. 7C is a diagram illustrating a network environment where an augmented reality user equipment is moving from a first geographical area to a different geographical area using predictive caching based on historical location data and user specific information.

FIGS. 7A-7C, provide illustrations of examples of the UE 102 moving within an edge environment 700, where additional information may be available. The priority list of qualified adjacent edge servers may be refined based on the additional information available. Starting with FIG. 7A, which illustrates the edge environment 700 with the UE 102, in the peripheral area 120 of the geographic edge area 108 of the edge server 106. The priority list of qualified adjacent edge servers may have been generated following the steps of method 500 as described in reference to FIG. 5. The UE 102 has a home location 710 located within a home edge server's 706 in a home edge area 708. The home location 710 is a location associated with the UE 102. The home location may be a home address, a primary residence address, billing address, or a determined location. The home location may be determined by the network operators or provided to the network 110. The historical location and duration data requested may include a reference to the UE's 102 home location 710. When qualifying the edge servers using the HPLMN, the HPLMN may provide an indication that a particular adjacent server is the home edge server 706 of the particular UE 102 for which the edge servers are being qualified. The UE 102 or application within the UE 102 may indicate which edge server is the home edge server 706 for the UE 102. After the edge server 106 begins transmitting context data to the servers on the priority list, which may include the second edge server 206 and the home edge server 706, the home edge server 706 may send an indication to the edge server 106 that the home location 710 is located within the home edge area 708 associated with the home edge server 706.

If there is contradictory or insufficient historical location and duration information available to enable a determination between prioritizing the second edge server 206 and the home edge server 706, home edge server 706 may be prioritized by default. In aspects, the home edge server 706 may store context for the UE 102 as the home location 710 is located in the home edge area 708. Therefore the home edge server 706 may not receive a higher priority as it already stores a portion of the context for UE 102. The degree of prioritization and decision to prioritize which server may also be influenced by the current or predicted available network resources.

In addition, the UE 102 may provide additional information either directly or indirectly to enable further refinement of the priority adjacent server list. In the example of 7A, an anticipated destination 709 is indicated within the second edge area 208. The anticipated destination 709 may be discovered through a variety of ways. Firstly, the UE 102 may indicate that it is currently navigating to the anticipated destination 709. This may require a high level of cooperation and feedback between the UE 102 and the edge server 106. In some aspects, the application running edge services on the edge server 106 may be a navigation system or include a navigation system, which indicates an anticipated destination 709 for the UE 102. The edge server 106 may be able to identify the anticipated destination 709 from the navigation system. The UE's 102 recent activity may indicate the anticipated destination. Activity may include data such as search engine searches, website history, SMS text message information, calendar information from the UE 102, phone calls, or other information that may allow the determination of anticipated destination 709. It may be determined there is a trending destination, such as a major sporting event or concert in an adjacent edge server geographic area. The adjacent edge servers with the trending destination may be given additional priority.

In the event that the anticipated destination 709 is determined to be within the second edge area 208 the second edge server 206 may have priority over the home edge server 706. However, the degree to which prioritization occurs with one server over another may relate to a level of confidence in the accuracy of the anticipated destination 709. For example, if an anticipated destination 709 is predicted based on received an internet search of "Best breakfast near me," and its 5 pm on a weekday, the confidence in that anticipated destination 709 may be low. Whereas, if the anticipated destination 709 was determined by an active navigation system running on the edge server 106, with the anticipated destination 709 as the destination, the confidence in the anticipated destination 709 may be so high that even the home edge server 706 is removed from the priority list.

FIG. 7B illustrates a user device in similar edge environment 750 as in FIG. 7A. In this example, the user device is a connected vehicle 752. In this example, the user device may also be a connected vehicle 752 (or known as "CV"). The CV 752 may generally be described as a vehicle comprising at least a processor, memory, and an antenna allowing it to connect directly to the telecommunications network via a node 104. The CV 752 may be a passenger automobile or it may be an autonomous or self-driving automobile. The CV 752 may be a commercial automobile such as a truck or van. The CV 752 may be a public or private transportation vehicle such as a bus, train, trolley, or other vehicles intended to carry a plurality of passengers.

The CV 752 may be located within the peripheral area 120 of the edge area 108. The priority list of qualified adjacent edge servers may have already been generated by the methods described in reference to FIGS. 2B-6. The home location 710 of the CV 752 may be known. If the historical location and duration data does not indicate the predicted destination 402 the edge server may provide a preference for the home edge server 706 where the home edge area 708 contains the CV's 752 home location 710.

The CV 752 may be recognized as being unique type of user device linked with a vehicle that is not a UE such as a cell phone, tablet, or other handheld device. As such, it may be determined that the CV 752 may only travel along roadways and may be capable of traveling at significant speeds. Additional details of the CV 752 may be determined, such as make, model, vehicle use (such as personal vehicle, delivery vehicle, or other commercial vehicle). The CV 752 may be a node for other devices within the vehicle as well, acting as a hot spot and internet data source for other user equipment within the vehicle. If it is determined that the edge services are being utilized by the UE 102 connected through the CV 752, methods discussed earlier may be more appropriate.

However, the CV 752 may also be utilizing edge services for navigation, self-driving, or other resource intensive processes. In some aspects, the anticipated destination 709 may be determined if the CV 752 is utilizing edge services for navigation or self-driving. The methods described FIG. 7A may be employed with the anticipated destination 709. In other aspects, only some navigation information may be available, such as a next navigation command 754. A great amount of deference may be given to the next navigation command 754, without making the same analysis of the situational data, the presumption being that the situational data would already be accounted for by the navigation system. The next navigation command 754 may indicate an intent of a non-autonomous vehicle and a direct instruction for an autonomous vehicle. Due to the importance of the next navigation command 754, priority may be given to whichever edge server would be indicated by the next navigation command 754. As illustrated in FIG. 7B, the second edge server 206 may receive priority over the home edge server 706.

Although not discussed in FIG. 7B, it is contemplated that the connected vehicle 752 may be an unmanned autonomous vehicle (hereinafter "drone"). Drones include flying vehicles, waterborne vehicles, and autonomous robotic technology having various types of locomotive technology, which may be able to navigate with as few restrictions as a human user. However, as these drones are not bound by the transportation infrastructure of CV 752, the method described therein may not be adequate. A connected drone may be determined to be a delivery drone with the home location 710 and varying delivery locations based on the connected drone's location and duration history. The home edge server 706 may have priority when the connected drone's location and duration history indicates the connected drone's previous trip was from somewhere other than the home location 710. Likewise, the home edge server 706 may not have as high of priority when the connected drone's location and duration history indicates the connected drone's previous trip was from the home location 710.

Turning to the last of the network maps 7C, which illustrates the UE 102 in an edge environment 770 where a type of user device, an augmented reality device (AR device) 772 may be engaged in augmented reality. The AR device 772 may be a user device including but not limited to a cellular telephone or tablet computer which presents an augmented reality image on a display to a user. The AR device 772 may also be a type of wearable augmented reality devices such as a headset, glasses, personal heads up display, or similar device which overlays images and text into a user's vision, this type of device as depicted in FIG. 7C is also known an augmented reality wearable device. The augmented reality (AR) wearable device may also be a virtual reality (VR) device as well when not allowing the user to perceive the world around them. The AR device 772 may use edge computing because of the resource intensive nature of AR and the sensitivity to latency. Further, presenting augmented reality to a user is a very time sensitive process as even small delays caused by network 110 delays from traditional computing could cause large distortions in the image quality or alignment between augmented images and the perceived world by the user.

The AR device 772 may be used recreationally and may involve an element of novelty or entertainment that may make prediction based off of historical location and duration information difficult. The AR device 772 may overly text or images in the immediate surroundings, such as displaying a restaurant closing hours or a creating small creature for the user to interact with. The location of images displayed or overlaid for the user on the AR device 772 may be monitored. The overlay image location data from the AR device 772 may be monitored as well. These images may not aid in the prediction of the AR device's 772 movement. The augmented images being displayed may be physically distant from the AR device 772. Such augmented images may be displayed in anticipation of future interaction with the user or to entice the user into a certain area. The display of a distant augmented image 774 may allow further refinement of the priority qualified edge server list.

The priority list may be generated by the methods discussed in reference to FIGS. 2B-7B. The edge server 106 may be made aware of the home location 710 of the AR device 772. Additional contextual information, such as the distant augmented image 774 location may be obtained as well, due to the nature of AR device 772 use. As illustrated in FIG. 7C, the distant augmented image 774 may be within the second edge area 208. The distant augmented image 774 may be placed in context with other images and text being displayed by the AR device 772. The distant augmented image 774 location data may be taken in context with the geographic and transportation infrastructure data. The distant augmented image 774 location and duration data may be stored in the network database storing location and duration data for the AR device 772. The priority list may be refined in favor of the second edge server 206, by analyzing the historical location and duration data for the distant augmented image 774 and the location and duration data of the AR device 772 for the current edge session. The AR device 772 may be populating a number of AR objects which indicate the direction of the distant augmented image 774.

Figure 8:
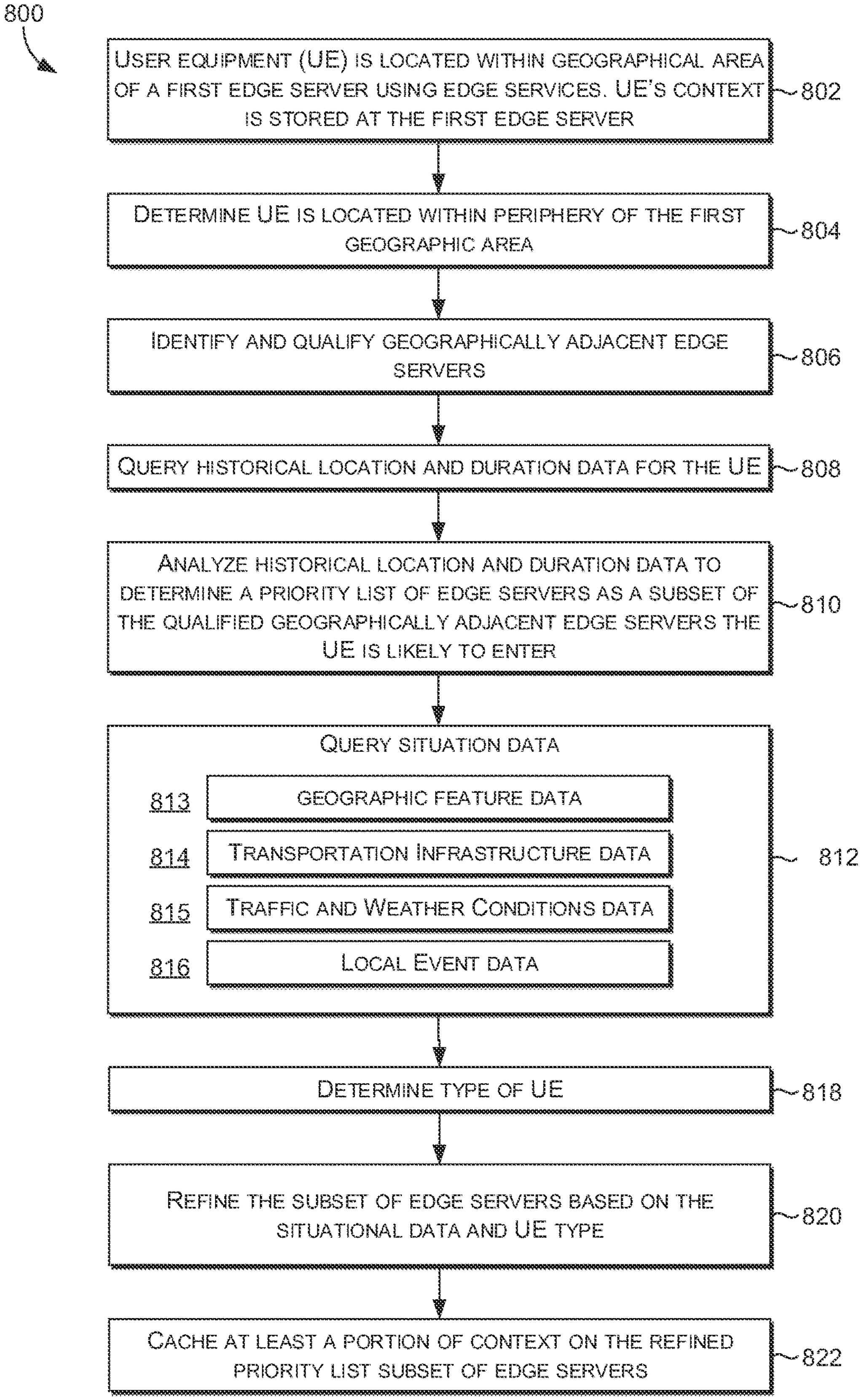
FIG. 8 is a flow chart illustrating the system of dynamically predictive context caching in adjacent edge servers applying relevant situational data and type of user equipment.

FIG. 8 illustrates a method 800 for predictive and dynamic user context transference. Method 800 incorporates the methods discussed in reference to FIGS. 2B-7C. At a first step 802, the UE 102 may be using edge services and is located within the geographical area 108 of a first edge server 106. At a second step 804, the UE's 102 location may be determined to be within the peripheral area 120 of the first geographic area 108. At a third step 806, adjacent edge servers to the first edge server 106 may be identified and qualified as discussed with relation to FIGS. 2B-7C. This can be a predetermined list or be queried from the network. At a fourth step 808, historical location and duration data for the UE 102 may be queried from a database on the network 110. At a fifth step 810, the historical location and duration data may be analyzed with respect to the list of the qualified adjacent edge servers to determine the priority list. At a sixth step 812, situational data may be queried. Situational data may include geographic data 813, transportation infrastructure data 814, traffic and weather condition data 815, and local event data 816. At an seventh step 818, a determination is made on the UE's 102 type. The types may include connected vehicle, drone vehicle, augmented reality wearable device, or a typical consumer device such as a cellular phone, handset, or tablet. Additional types may be identified as well and categorized in once of types above or treated uniquely. At a eighth step 820, the priority list of qualified adjacent edge servers may be refined based on the situational data and UE Type. At a ninth step 822, at least a portion of the context data is cached to at least a portion of the edge servers on the refined priority list.

Figure 9:
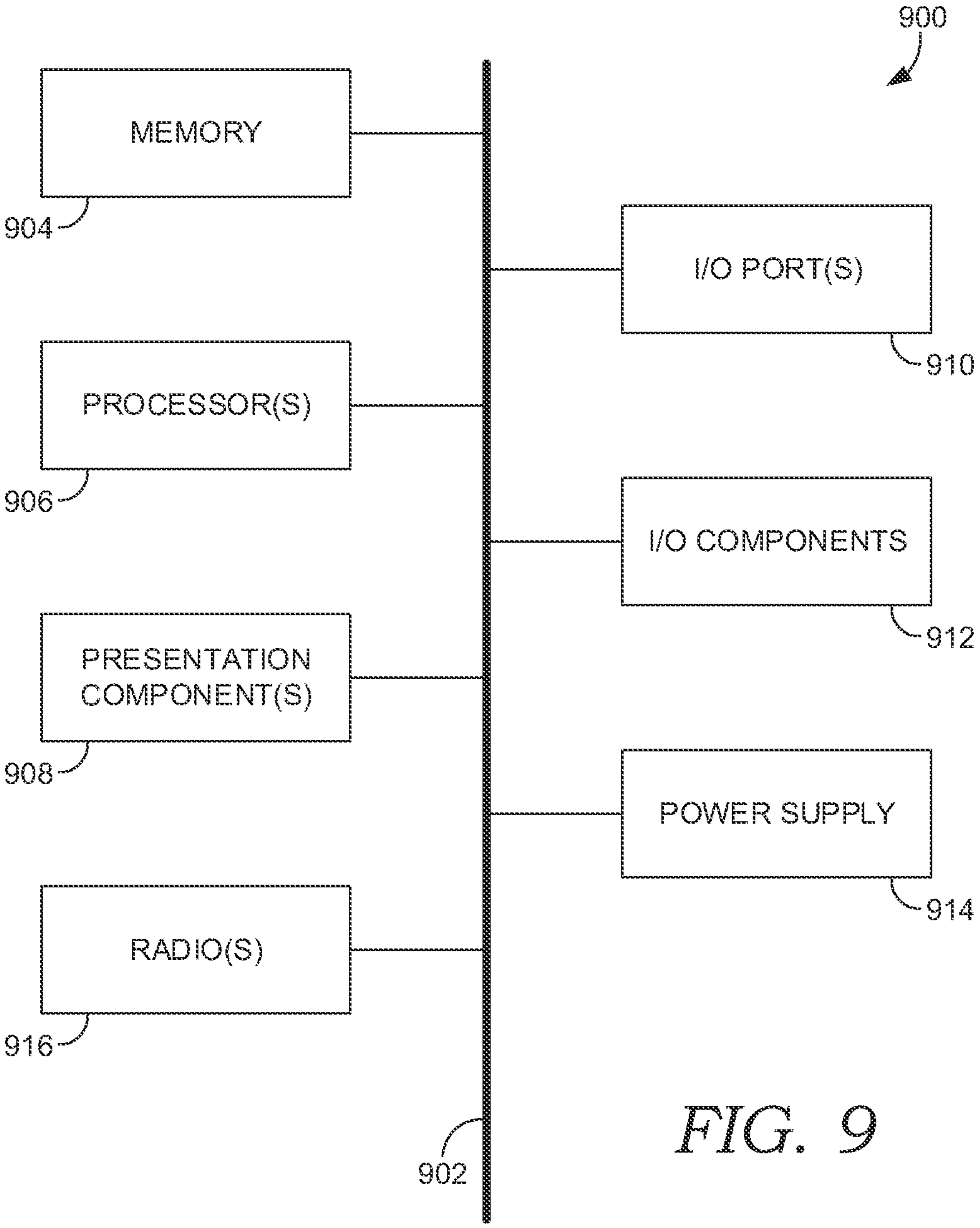
FIG. 9 depicts a diagram of an exemplary computing environment suitable for use in implementations of the present disclosure.

Referring now to FIG. 9, a diagram is depicted of an exemplary computing environment suitable for use in implementations of the present disclosure. In particular, the exemplary computer environment is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 9, computing device 900 includes bus 902 that directly or indirectly couples the following devices: memory 904, one or more processors 906, one or more presentation components 908, input/output (I/O) ports 910, I/O components 912, power supply 914 and radio(s) 919. Bus 902 represents what may be one or more busses (such as an address bus, data bus, or combination thereof). Although the devices of FIG. 9 are shown with lines for the sake of clarity, in reality, delineating various components is not so clear, and metaphorically, the lines would more accurately be grey and fuzzy. For example, one may consider a presentation component, such as a display device to be one of I/O components 912. Also, processors, such as one or more processors 906, have memory. The present disclosure hereof recognizes that such is the nature of the art, and reiterates that FIG. 9 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 904 includes computer-storage media in the form of volatile and/or nonvolatile memory. Memory 904 may be removable, non-removable, or a combination thereof. Exemplary memory includes solid-state memory, hard drives, optical-disc drives, etc. Computing device 900 includes one or more processors 906 that read data from various entities, such as bus 902, memory 904, or I/O components 912. One or more presentation components 908 presents data indications to a person or other device. Exemplary one or more presentation components 908 include a display device, speaker, printing component, vibrating component, etc. I/O ports 910 allow computing device 900 to be logically coupled to other devices, including I/O components 912, some of which may be built in computing device 900. Illustrative I/O components 912 include a microphone, joystick, game pad, satellite dish, scanner, printer, wireless device, etc.

Radio 919 represents a radio that facilitates communication with a wireless telecommunications network. Illustrative wireless telecommunications technologies include CDMA, GPRS, TDMA, GSM, and the like. Radio 919 might additionally or alternatively facilitate other types of wireless communications including Wi-Fi, WiMAX, LTE, or other VoIP communications. As can be appreciated, in various embodiments, radio 919 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for dynamically transferring user data between edge servers based on predicted need, the system comprising:

two or more radio access network (RAN) nodes comprising a first RAN node associated with a first edge server and a second RAN node associated with a second edge server, wherein the first RAN node has a first coverage area; and one or more computer processing components configured to perform operations comprising:

receiving, from a User Equipment (UE) connected to the first RAN node, a request to start an edge instance;

storing context data on the first edge server;

determining the UE is located within a peripheral area of the first coverage area;

based on the determining, querying of historical location data for the UE;

based on the historical location data, identifying the second RAN node as a predicted next RAN node for the UE; and caching the context data on the second edge server.

2. The system of claim 1, further comprising identifying the UE is likely utilizing a transportation infrastructure element.

3. The system of claim 2, further comprising determining the a transportation infrastructure element communicates to a third adjacent edge server and prioritizing the third adjacent edge server over other servers.

4. The system of claim 1, further comprising identifying the UE is likely to be blocked by topography into moving into a geographic edge area of a fourth edge server and lowering the priority of the fourth edge server.

5. The system of claim 1, further comprising:

querying traffic data;

determining the UE is likely to deviate from the historical location data; and adjusting the priority list of geographically adjacent edge servers.

6. The system of claim 1, further comprising, predicting a destination for the UE based on historical location data for the UE.

7. The system of claim 6, further comprising, querying a topography and transportation infrastructure database, predicting a travel path to the predicted destination, and adjusting the priority list according to the travel path.

8. The system of claim 1, further comprising, receiving from the UE an indication of the UE's destination is in a third adjacent server and adjusting the priority list to favor the third adjacent server.

9. The system of claim 1, further comprising, determining which category of a plurality of device categories the UE belongs.

10. The system of claim 9, wherein the UE is a connected vehicle category of devices and a current navigation instruction for the UE adjusts the priority list.

11. The system of claim 9, wherein the UE is an augmented reality device.

12. The system of claim 1, further comprising, removing edge servers from the priority list based on:

querying a topography and transportation infrastructure database, determining which category of a plurality of device categories the UE belongs, and identifying a status for a set of conditions including weather, traffic, and current events.

13. Computer-readable storage media having computer-executable instructions embodied thereon that, when executed by one or more processors, cause the processors to:

receive a request from a user equipment (UE) to utilize edge services via a first RAN node associated with a first edge server, the first RAN node having a first coverage area;

store context data on the first edge server;

determine the UE is located within a peripheral area of the first coverage area;

based on the determining, query historical location data for the UE;

based on the historical location data, identify a second RAN node associated with a second edge server as a predicted next RAN node for the UE; and cache at least a portion of the context data on the second edge server.

14. The computer-readable storage media of claim 13, wherein one or more of the processors is located on a remote server on a network connected to the first edge server.

15. The computer-readable storage media of claim 13, further comprising determining the velocity of the UE exceeds a certain limit and increasing the frequency of determining the location of the UE.

16. The computer-readable storage media of claim 13, wherein a UE navigation destination is received and the priority list is reduced to the edge server indicated by the UE navigation destination.

17. A method for performing predictive and dynamic user context transference, comprising:

receiving a request for edge services on a first edge server from a user equipment (UE), the first edge server being associated with a first RAN node having a first coverage area;

storing context data on the first edge server;

determining the UE is located within a peripheral area of the first coverage area;

based on the determining, querying historical location data for the UE;

based on the historical location data, identifying a second RAN node associated with a second edge server as a predicted next RAN node for the UE; and caching a portion of the context data on the second edge server.

18. The method of claim 17 further comprising, determining the UE is a connected vehicle running a navigation application routing a set of directions which direct the UE to travel into a geographic area of a third adjacent edge server, wherein the third adjacent edge server is given additional priority over the second edge server.

19. The system of claim 1, wherein the caching occurs while the UE remains connected to the first RAN node and the first edge server continues to provide edge services to the UE.

20. The system of claim 1, further comprising preparing a priority list of geographically adjacent edge servers based on the historical location data, wherein the second edge server is on the priority list.

* * * * *